(12) United States Patent
Milazzo et al.

(10) Patent No.: US 11,012,472 B2
(45) Date of Patent: May 18, 2021

(54) SECURITY RULE GENERATION BASED ON COGNITIVE AND INDUSTRY ANALYSIS

(71) Applicant: International Business Machines Corporation, Armonk, NY (US)

(72) Inventors: Marina Milazzo, Sugar Hill, GA (US); Michael Spisak, East Northport, NY (US); Carlos Alberto Lopez Chinchilla, Santa Ana (CR); Steven D. McKay, Kechi, KS (US); Eric Hanratty, Freeport, FL (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 16/210,063

(22) Filed: Dec. 5, 2018

(65) Prior Publication Data

US 2020/0186569 A1    Jun. 11, 2020

(51) Int. Cl.
*H04L 29/06* (2006.01)

(52) U.S. Cl.
CPC .......... *H04L 63/20* (2013.01); *H04L 63/0263* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 8,117,640 B1* | 2/2012 | Moriconi | H04L 63/102 726/1 |
| 2006/0026679 A1* | 2/2006 | Zakas | H04L 63/1441 726/22 |
| 2014/0007222 A1 | 1/2014 | Qureshi et al. | |
| 2014/0059641 A1 | 2/2014 | Chapman, II et al. | |
| 2014/0215624 A1* | 7/2014 | Suzio | H04L 63/145 726/23 |
| 2015/0163242 A1* | 6/2015 | Laidlaw | G06N 7/023 726/22 |
| 2017/0126727 A1 | 5/2017 | Beam et al. | |

\* cited by examiner

*Primary Examiner* — Andrew J Steinle
(74) *Attorney, Agent, or Firm* — Stephen J. Walder, Jr.; Jeffrey S. LaBaw

(57) ABSTRACT

Security rules management mechanisms are provided. A cognitive computing system of the security rules management system ingests natural language content, from one or more corpora, describing features of security attacks, and ingests security event log data from a monitored computing environment. The cognitive computing system processes the natural language content from the one or more corpora and the security event log data to identify attack characteristics applicable to the security event log data. A security rule query engine evaluates existing security rules present in a security rules database to determine if any existing security rule addresses the attack characteristics. In response to the evaluation indicating that no existing security rule addresses the attack characteristics, a security rule generator automatically generates a new security rule based on the attack characteristics, which is then deployed to the monitored computing environment.

20 Claims, 5 Drawing Sheets

SECURITY RULE GENERATION BASED ON COGNITIVE AND INDUSTRY ANALYSIS

BACKGROUND

The present application relates generally to an improved data processing apparatus and method and more specifically to mechanisms for generating security rules, e.g., security information and event management (SIEM) rules, based on a cognitive and industry analysis.

Security information and event management (SIEM) is an approach to security management that combines security information management (SIM) with security event management (SEM) functions into a single security management system. A SIEM system aggregates data from various data sources in order to identify deviations in the operation of the computing devices associated with these data sources from a normal operational state and then take appropriate responsive actions to the identified deviations. SIEM systems may utilize multiple collection agents that gather security related events from computing devices, network equipment, firewalls, intrusion prevention systems, antivirus systems, and the like. The collection agents may then send this information, or a subset of this information that has been pre-processed to identify only certain events for forwarding, to a centralized management console where security analysts examine the collected event data and prioritize events as to their security threats for appropriate responsive actions. The responsive actions may take many different forms, such as generating alert notifications, inhibiting operation of particular computer components, or the like.

IBM® QRadar® Security Intelligence Platform is an example of one SEEM system which is designed to detect well-orchestrated, stealthy attacks as they are occurring and immediately set off the alarms before any data is lost. By correlating current and historical security information, the IBM® QRadar® Security Intelligence Platform solution is able to identify indicators of advanced threats that would otherwise go unnoticed until it is too late. Events related to the same incident are automatically chained together, providing security teams with a single view into the broader threat. With QRadar®, security analysts can discover advanced attacks earlier in the attack cycle, easily view all relevant events in one place, and quickly and accurately formulate a response plan to block advanced attackers before damage is done.

In many SIEM systems, the SIEM operations are implemented using SIEM rules that perform tests on computing system events, data flows, or offenses, which are then correlated at a central management console system. If all the conditions of a rule test are met, the rule generates a response. This response typically results in an offense or incident being declared and investigated.

Currently, SIEM rules are created, tested, and applied to a system manually and sourced from out of the box rules (base set of rules that come with a SIEM system), use case library rules ("template" rules provided by provider that are organized by category, e.g., NIST, Industry, etc.), custom rules (rules that are manually developed based on individual requirements), and emerging thread rules (manually generated rules derived from a "knee jerk" reaction to an emerging thread or an attack). All of these rules must be manually created, testing and constantly reviewed as part of a rule life-cycle. The life-cycle determines if the rule is still valid, still works, and still applies. Furthermore, the work involved in rule management does not scale across different customer SIEM systems due to differences in customer industries, customer systems, log sources, and network topology.

SIEM rules require constant tuning and upkeep as new systems come online, new software releases are deployed, and new vulnerabilities are discovered. Moreover, security personnel can only create SIEM rules to detect threats that they already know about. SIEM rules are not a good defense against "Zero Day" threats and other threats unknown to the security community at large.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, wherein the at least one memory comprises instructions which are executed by the at least one processor and specifically configure the at least one processor to implement a security rules management system. The method comprises ingesting, by a cognitive computing system of the security rules management system, natural language content from one or more corpora of natural language content describing features of security attacks, and security event log data from a monitored computing environment. The method further comprises processing, by the cognitive computing system, the natural language content from the one or more corpora and the security event log data to identify attack characteristics applicable to the security event log data. In addition, the method comprises evaluating, by a security rule query engine of the security rules management system, existing security rules present in a security rules database to determine if any existing security rule addresses the attack characteristics. Moreover, the method comprises, in response to the evaluation indicating that no existing security rule addresses the attack characteristics, automatically generating, by a security rule generator of the security rules management system, a new security rule based on the attack characteristics. The method also comprises deploying, by the security rules management system, the automatically generated new security rule to the monitored computing environment.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
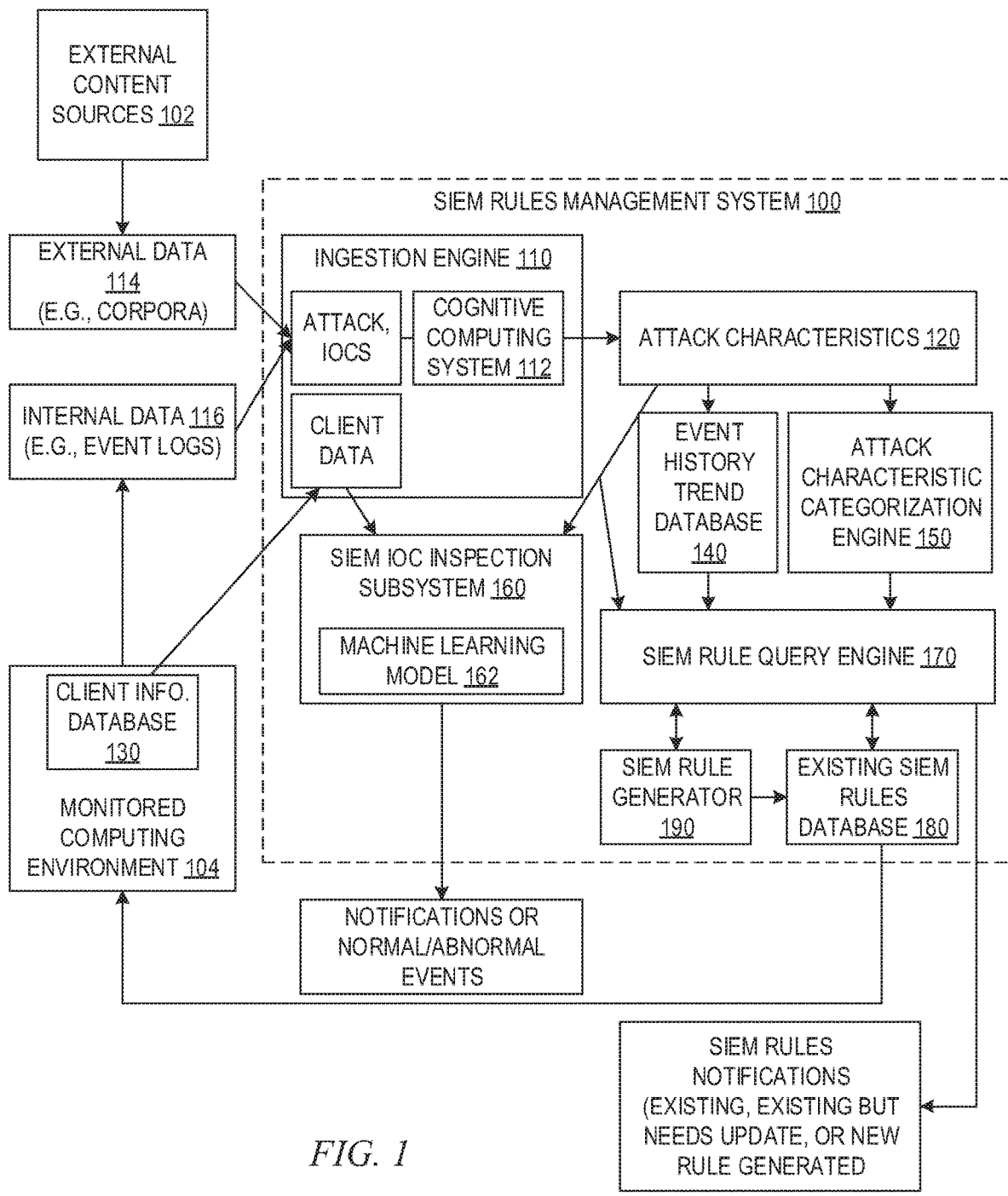
FIG. 1 is an example diagram illustrating the primary operational elements and a workflow of these primary operational elements in accordance with one illustrative embodiment.

Mechanisms are provided for generating security rules, e.g., security information and event management (SIEM) rules, based on a cognitive and industry analysis. It should be appreciated that while the illustrative embodiments described herein will reference SIEM rules and SIEM rule generation, the illustrative embodiments may be applied to any security rules and security rule generation. SIEM rules are based off of events or flows from inline network devices throughout a network of a managed computing environment, e.g., events may be obtained from firewalls, servers, endpoints, and the like, and the SIEM rules are applied based on the activities happening throughout the network. Other types of security rules are also inline or are associated with span/tap ports and look at packet level datagrams and take actions based on packet signatures or heuristics. In either case, the mechanism of the illustrative embodiments described herein may be implemented to perform security rule management and generation, and in some illustrative embodiments may be implemented with regard specifically to SIEM rules. Thus, in general, references to SIEM rules hereafter may also be considered to reference security rules in general, in other illustrative embodiments.

As noted previously, security information and event management (SIEM) rule generation is largely a manual process and is largely a responsive manual process that is responsive to known threats. The SIEM rules themselves are static in nature. SIEM rules, and the rule generation process itself, needs to evolve from static criteria based rule mechanisms, to a solution that involves adaptive conditions that create and update themselves automatically. In such a case, the rules continually evolve based on the latest data about security events, threat intelligence, business context, and changes in the information technology (IT) environment.

The illustrative embodiments provide mechanisms for generating security information and event management (SIEM) rules based on a cognitive and industry analysis. The mechanisms of the illustrative embodiments automated rule creation and maintenance by providing computerized tools for scanning and analyzing threat environments, information technology (IT) configurations, and business activity, and intelligently creating SIEM rules dynamically and automatically using advanced big data techniques and artificial intelligence. The generated SIEM rules may be automatically applied to a monitored computing environment to learn if the SIEM rule needs to be strengthened or deprecated.

In one illustrative embodiment, a SIEM rule management system obtains security log information from managed endpoint devices, e.g., servers, client computing devices, computing network devices, firewalls, database systems, software applications executing on computing devices, and the like. The security log information may specify various events associated with the particular managed endpoint devices that represent events of interest to security evaluations, e.g., failed login attempts, password changes, network traffic patterns, system configuration changes, etc. Furthermore, the SIEM rule management system queries a cognitive computing system configured for cyber security applications, e.g., IBM Watson™ for Cybersecurity, available from International Business Machines (IBM) Corporation of Armonk, N.Y., to identify from one or more corpora of natural language and/or structured content, indicators of compromise (IOCs) that specify features indicative of possible threats to a computing resource or computing environment. For example, the cognitive computing system performs cognitive processing of one or more corpora of natural language documents, e.g., web pages, electronically stored cyber security trade publications, security based electronic documentation from government sources and/or trade organizations, any other media, blogs, papers, messaging applications and/or services, etc., or any other source of cyber security knowledge regarding known or newly discovered threats or threat patterns (combinations of computer activities or characteristics of computer activity indicative of an attack). The cognitive computing system generates an IoC vector output that comprises vector slots having attack characteristics for any identified attacks. These attack characteristics may be extracted from the output, as discussed hereafter, for use in categorizing potential attacks or threats.

It should be appreciated that, within the context of this description, the term "attack characteristics" refers to combinations of attack vectors/methods/behaviors and/or Indicators of Compromise (IOC) that define and characterize the way that an attack works. Furthermore, in the context of this description, the term "Indicator of Compromise (IoC)" refers to an individual element that is used as a means to compromise a computer system. These IoCs could take the form of IP addresses, file hashes, URLs, executable files, etc. For example, in a standard brute force attack, a malicious device will try to determine the password of a user, usually attempting hundreds/millions of combinations in the process (pattern). An "attack characteristic" in this example is the high amount of login failures (each failed attempt) from a device (IoC) known for malicious activities, e.g., a measure or pattern associated with an IoC that is indicative of an attack. As another example, the attack characteristics of a bank robbery are: the time of the day, the behavior of the individual (is he wearing dark glasses, helmets, hats, bags, is he nervous, is he making signals?). An IoC may be a determination as to whether the individual has a criminal history, whereas an attack characteristic may be the types of crimes previously committed, the recency of the crimes committed, etc. All these elements provide the criteria to identify a potential attack.

The cognitive computing system may continuously or periodically scan the sources of content of the one or more corpora for content to ingest and cognitively analyze to identify potential threats from the threat information extracted from these sources of content. The cognitive computing system may evaluate these potential threats via a cognitive analysis to determine a confidence level that a potential threat is a real or false threat finding, and provide this information to the SIEM rule management system for further processing, as described hereafter. Again, one example of a cognitive computing system that may be used to provide input to the SIEM rule management system based on the cognitive evaluation of one or more corpora of structure/unstructured content is the IBM Watson™ for Cybersecurity product available from IBM Corporation. IBM Watson™ for Cybersecurity curates threat intelligence from millions of research papers, blogs, new stories, and other sources of content, and provides artificial intelligence (AI) insights into cyber threats. The IBM Watson™ for Cybersecurity cognitive computing system uses machine learning that ingests threat intelligence from these various sources and categorizes them using entity extraction to find the insights within, e.g., IP addresses, file hashes, campaign names MD5 hash, URLs, domain names, etc. In accordance with the mechanisms of the illustrative embodiments, these insights, in the form of IoCs, are input to the SIEM rule management system. It should be appreciated that IBM Watson™ for Cybersecurity is only one example of a cognitive computing system that may be used to provide such IoC input to the SIEM rule management system and other cognitive computing systems may be utilized in other illustrative embodiments without departing from the spirit and scope of the present invention.

The mechanisms of the illustrative embodiments, in addition to the security log information and the information regarding threats, or indicators of compromise (IoCs), identified by the cognitive computing system (e.g., IBM Watson™ for Cybersecurity in some illustrative embodiments), which are collectively referred to as SIEM events herein, may further ingest information that is collected and recorded about the specific users of the SIEM rules management system, e.g., the clients of the SIEM rules management system whose computing environments are being managed by the SIEM rules management system. For example, the SIEM rules management system may ingest data about each managed computing environment indicating asset information, employee physical locations, office locations, client industry, incident data, etc.

The SIEM rules management system ingests each SIEM event, i.e. the security log information specifying security events and the cognitive system information specifying security events corresponding to real threats, and extracts attack characteristics from the ingested SIEM event information. Examples of these attack characteristics include a type of event specified in a security log, source identifier (e.g., Internet Protocol (IP) addresses, Uniform Resource Locators (URLs), domains, etc.), file hashes, anti-virus and/or firewall signatures (i.e. unique identifiers given to a known threat so that the threat can be identified in the future), attack vector/method (i.e., a path or means by which a hacker can gain access to a computer system for malicious purposes), and the like. These attack characteristics may be used to populate and/or update a security event history trend database which stores entries specifying security events that represent security threats (or attacks). The security event history trend database may be used to recognize attack characteristics that have been seen before with previously identified security threats and may store identifiers of associated actions taken in response to these potential attacks, e.g., what SIEM rule was used, what new SIEM rule was generated, etc. If an entry is present in the security event history trend database that matches the particular combination of attack characteristics identified via that extraction of these characteristics from the ingested information, then a weighting value associated with that entry may be increased to reflect the increased frequency of seeing that particular combination of attack characteristics. If a match is not found, then a new entry may be added to the security event history trend database. With the security event history trend database, the attack characteristics may be used to identify potential security threats even in the case where an indicator of compromise (IoC) is not specifically identified in the ingested data by the cognitive computing device.

The analysis of the attack characteristics comprises a categorization of the attack characteristics into predetermined categories. For example, the attack vector/methods attack characteristic may be analyzed to determine security log sources and event IDs, affected device groups, rule categories and thresholds, etc. Moreover, the extracted attack characteristics associated with the Internet Protocol (IP) addresses, Uniform Resource Locator (URL)/domain indicators, hashes, signatures, and the like may be analyzed to identify references to data collections. The results of this analysis may then be categorized into a plurality of predefined categories. For example, there may be various types of categories, e.g., log source categories, event categories, event sub-categories, event identifier categories, threshold categories, and the like, and each type of category may have predefined categories within them, e.g., a category within the "log sources category" type may be "Microsoft Windows Security Event Log". The particular attack characteristics of a security event may be categorized into a plurality of these categories to thereby categorize the security event.

The SIEM rules management system further includes a SIEM IoC inspection subsystem that implements a machine learning model that learns, for various client data and industry data, which IoC values in the IoC vector are potentially normal for that industry and client and which IoC values are likely indicative of an actual threat or attack. For example, the cognitive computing system may identify an IoC value based on a large network traffic burst whose source is from a geological area known as a security threat source, e.g., a large network traffic burst from a source in Country A, where through cognitive analysis of a corpus of content, it has been determined that Country A may be a source of attacks on computing systems associated with the particular client of the SIEM rule management system.

In some illustrative embodiments, the SIEM IoC inspection subsystem's machine learning model learns patterns of information indicative of an actual threat and patterns of information indicative of a normal operation and may evaluate input to generate a confidence value as to whether the identified IoCs in the output of the cognitive computing system are in fact associated with an actual attack or threat, or are instead associated with normal operation. For example, if a large network traffic burst comes from Country A, however the particular client has no presence, e.g., no offices, employees, or business ties, in Country A, this burst of traffic would be considered abnormal and more indicative of a threat or attack than a normal operation. The various features associated with the IoC, the client data, and the industry characteristics associated with the particular client, are evaluated using the trained machine learning model of the SIEM IoC inspection subsystem to generate a confidence indicator specifying whether the SIEM IoC analysis indicates a normal operation or an abnormal operation. An appropriate notification may be generated indicating whether or not the IoC is associated with normal operations or abnormal operations if desired by the particular implementation.

In the case that the confidence indicator indicates that the IoC is more likely than not associated with an attack or threat (e.g., the confidence indicator has a value that is equal to or above a particular threshold, or equal to or below a particular threshold, depending on the particular implementation), this information is fed back into the SIEM rules management system for use in generating a query to look for appropriate SIEM rules that address the attack or threat. The SIEM rules management system utilizes the machine learning model's evaluation of the IoC relative to the client data and the particular industry, as well as the identification of attack characteristics from the ingested information, their categorization, and the comparison to previously identified security threats or attacks as specified in the security event history trend database, to determine if an attack or threat is recognized in the ingested security event information from the cognitive computing system and the security log information, taking into consideration the normal operations of the particular client and the industry.

For example, the confidence indicator generated by the machine learning model of the SIEM IoC inspection subsystem indicates to the SIEM rules management system whether the IoCs identified by the cognitive computing system are indicative of an attack or threat. In addition, the attack characteristics extracted from the ingested data may be used to match to entries in the security event history trend database to determine if a similar set of attack characteristics were encountered previously and the corresponding action taken, e.g., existing SIEM rule used, new SIEM rule generated by the SIEM rules management system, or the like.

If either or both of these attack identification operations indicate that it is likely that the ingested information indicates an attack or threat, the SIEM rules management system generates a query to search a SIEM rule database to determine if there is a SIEM rule that already exists that is designed to handle the identified attack or threat. If the security event history trend database has a matching entry with that of the extracted attack characteristics, within a fuzzy tolerance, e.g., a degree of matching is equal to or above a predetermined threshold, and the corresponding entry indicates a particular SIEM rule was used previously in response to that identified attack or threat, then SIEM rules management system may identify that SIEM rule as an existing SIEM rule that handles the identified attack or threat. If there is not an explicit identification of a SIEM rule in this manner, then a search query is generated by the SIEM rules management system that includes the attack characteristics, categories, or the like, as identified from the ingested data.

The search query is then applied to the SIEM rule database to identify one or more SIEM rules that have a sufficiently high match with the attack characteristics, categories, and/or the like, specified in the SIEM rule search query. Again, fuzzy matching criteria may be utilized that indicates a minimum degree of matching required to indicate that a corresponding SIEM rule matches the SIEM rule search query criteria. The matching SIEM rules may be ranked relative to one another based on their degrees of matching. The highest ranking SIEM rule may then be analyzed to determine if it has a sufficiently high match to the attack characteristics to indicate that the existing SIEM rule is sufficient to handle the attack or threat. If the SIEM rule is a 100% match, then a determination may be made that there is a pre-existing SIEM rule that handles the attack or threat and that no updates to the SIEM rule are necessary. However, if the match is not 100%, but is equal to or higher than a predetermined threshold, e.g., a match of 80% or greater but less than 100%, then a determination may be made that there is a pre-existing SIEM rule that can handle the attack or threat, but that the pre-existing SIEM rule may need some updates to make it a 100% match for handling the attack or threat.

If the degree of matching is below a predetermined threshold, e.g., below 80% match, then it may be determined that there is not a pre-existing SIEM rule to handle the attack or threat and that a new SIEM rule needs to be generated. In such a case, a SIEM rule generator of the SIEM rules management system generates a new SIEM rule specifying the attack characteristics extracted from the ingested information and associating with these attack characteristics a corresponding action to be taken in response to these attack characteristics being identified in new ingested data. The automatically generated SIEM rule generated by the SIEM rule generator of the SIEM rules management system may be stored in a SIEM rules repository or database and enabled for use in monitoring of the client computing environment by one or more monitoring engines of a SIEM based system. Thus, in this way, SIEM rules may be automatically generated for a target computing environment based on the collective knowledge of attacks or threats obtained from client specific security event logs and data, and cognitive computing evaluation of one or more corpora of security intelligence information and publicly available content available from a variety of different sources of security information.

The following is an example illustrating an operation of the mechanism of one illustrative embodiment with regard to an example brute force attack of password cracking from an IP address 169.0.0.1. For simplicity, it is assumed that the source IP address is present in the security logs, which in this example are Microsoft Windows® (a registered trademark of Microsoft Corporation) operating system security logs, but could be security logs from any other operating system or security event logging mechanism. In this example, it is assumed that the monitored (or target) computing environment of the customer, i.e. the organization, individual, or the like, that employs the operations of the SIEM rule management system of the illustrative embodiment, has security monitoring engines implemented on their computing resources present in the monitored computing environment which employ SIEM rules to identify and log security events occurring in association with these computing resources. Thus, for example, the security monitoring engines may identify internal security events that are internal to monitored computing environment, log them, and provide the security logs as internal security event data that may be analyzed by the SIEM rule management system of the illustrative embodiments. For example, a security monitoring engine may identify an excessive number of login failure events from the same username (this is a pattern/vector/method), where these failed login events are logged internally by the security monitoring engine employed at the monitored computing environment.

In addition, a cognitive computing system, such as the IBM Watson™ for Cybersecurity cognitive computing system in one illustrative embodiment, may process one or more corpora of content from a variety of different sources and determine that a brute force attack from IP address 169.0.0.1 has been reported by a security intelligence service or an article/publication by a security vendor/researcher may mentions such a brute force attack originating from the IP address 169.0.0.1. Moreover the SIEM rules management system may identify, based on event history trends data stored in a security events history trends database of the SIEM rules management system, that there appears to be a trend in the industry (e.g., banking) of brute force attacks originating from IP addresses associated with Country A.

This information may all provide inputs that are ingested by the SIEM rules management system for evaluation. That is, the SIEM rules management system digests the information and analyzes it to extract the attack characteristics. In this example, the SIEM rules management system extracts the following attack characteristics—IoCs: IP address 169.0.0.1; Vector/Method: Excessive login failures for a single username.

The attack characteristics are further analyzed to categorize the attack characteristics in accordance with a plurality of types of categories, and with regard to predefined categories of each type. For example, with this running example brute force attack, the attack characteristics may be categorized as follows:

a. Based on analysis of the attack vector:
     i. Log Sources Category: Windows Security Event Log.
     ii. Event Category: Authentication.
     iii. Event Sub-Category: Failure.
     iv. Event ID: 4625 (This is a mapping to "An account failed to log on").
     v. Threshold: 50 login failure events in 1 minutes from a single username.
   b. Based on analysis of the IoCs generated by the cognitive computing system:
     i. IP Address: 169.0.0.1
   c. Based on an analysis of the event properties involved:
     i. Source IP.
     ii. Username.

The SIEM rules management system further implements cognitive computing operations by a cognitive computing system trained using machine learning processes, to evaluate the specific characteristics of the monitored computing environment of the customer or client, with regard to the attack characteristics and IoCs. For example, with regard to the IP address 169.0.0.1, which is an IP address originating with Country A, the cognitive operations evaluating the characteristics of the customer/clients' monitored computing environment (or environments) may determine in this example that the customer/client, assumed hereafter to be a corporation, does not have any authorized users that are located in Country A based on the corporations own corporate structure information. Moreover, the cognitive computing system may perform a historical analysis of login attempts by users within the corporation's monitored computing environments to determine how many login failures from a single username is considered normal for the corporation's monitored computing environments. Furthermore, the cognitive computing system may analyze industry characteristics to determine if there are any correlations between the identified IP address 169.0.0.1 and the particular industry of the corporation, which in this example there are no conclusive correlations found, i.e. this IP address is not identified as being used by the corporation for any specific purpose in the industry.

Based on a cognitive evaluation of these various factors, the cognitive computing system may determine a confidence score or probability score indicating a probability or confidence that the security event is likely an attack. For example, in this case, since the corporation has no authorized users that would attempt to login from an IP address located in Country A, the number of failed login attempts associated with the security event is higher than the historical analysis would indicate to be normal, and there are no correlations between the IP address and valid uses of that IP address in the industry of the corporation, a confidence or probability score of, for example, 90% may be generated by the cognitive computing system indicating a 90% probability or confidence that this security event is associated with an actual attack on the computing resources of the monitored computing environment.

Having determined that the security event is most likely associated with an actual attack on the computing resources of the monitored computing environment based on the cognitive evaluation of one or more corpora of content, the internal security event information obtained from the monitored computing environment, and cognitive evaluation of the customer/client's specific information regarding the monitored computing environment and/or customer/client themselves (e.g., industry information, organization structure information, etc.), the SIEM rules management system performs operations for determining if there are existing SIEM rules for addressing the attack and whether a new SIEM rule should be generated automatically. For example, using the categorization of the attack characteristics and IoCs discussed above, the SIEM rules management engine runs a query on the local SIEM rules associated with the monitored computing environment and another query on an external SIEM rules repository to find existing rules that already cover the attack characteristics. For example, a search of the local and external rules repositories is performed based on the particular categories of the attack characteristics and IoCs to identify any SIEM rules that reference these particular categories and characteristics/IoCs. An evaluation of the matching rules is performed to determine a degree of matching which is then compared to one or more thresholds as previously described above to determine if there is a SIEM rule that sufficiently matches, if there is a SIEM rule that matches but may need some updating, or if a new SIEM rule needs to be generated.

In the present example, it is assumed that no existing SIEM rule is found that sufficiently matches the categorized attack characteristics/IoCs and thus, a new SIEM rule needs to be created using the categorizations of attack characteristics generated previously. For example, a SIEM rule is generated by the SIEM rule generator, that has the following conditions based on the attack characteristics and IoCs and their categorizations generated previously:

1. When the events are detected from Windows Security Event Log.
   2. And when the event category is Authentication.Failure
   3. And when the event ID is 4625
   4. And when at least 50 events are detected with the same source IP and username, in 1 minute.

These conditions are paired with an appropriate responsive action that is performed when these conditions are met by a subsequent security event identified by monitoring engines, e.g., sending a notification to a system administrator, blocking access to computing resources, logging the security event in a particular log data structure, etc. The resulting SIEM rule is stored in the local SIEM rules used by the security monitoring engine(s) of the customer/client's monitored computing environment and enables the use of the newly, and automatically, generated SIEM rule by the security monitoring engine(s). In addition, the SIEM rule that is generated may also be exported to the external rules repository for use by other customers/clients with their security monitoring engine(s) when the SIEM rule management system searches the external rules repository for a matching SIEM rule. In this example, the resulting SIEM rule will trigger whenever a source IP is failing at authenticating on computing devices using a Microsoft Windows™ operating system and corresponding Windows Security Event Log mechanisms, regardless of the source IP address, this will provide coverage in case that the attacker changes the IP address.

Thus, the illustrative embodiments provide mechanisms for cognitive evaluating structured/unstructured content to identify characteristics of security attacks and indicators of compromise (IoCs) that are described by various sources. The illustrative embodiments further leverage cognitive evaluation of these identified attack characteristics and IoCs, along with security event information obtained from specific monitored computing environments, specific information about the particular monitored computing environments, e.g., historical event trend information, and/or customer/client information, e.g., organizational structure information, to determine a probability or confidence that a security event experienced by the monitored computing environment is an attack or not. Moreover, the illustrative embodiments, in response to determining the security event is likely an attack, performs a search for existing SIEM rules that address the attack characteristics/IoCs and determines if there is an adequate existing SIEM rule, a SIEM rule that needs to be updated, or if a new SIEM rule needs to be generated automatically for handling such attacks. In the latter case, the illustrative embodiments provide an automated mechanism for generating the SIEM rule and deploying it for use by security monitoring engines at customer/client monitored computing environments. Hence, an automated self improving security monitoring capability is provided via the mechanisms of the illustrative embodiments.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an example diagram illustrating the primary operational elements and a workflow of these primary operational elements in accordance with one illustrative embodiment. As shown in FIG. 1, the SIEM rules management system 100 includes an ingestion engine 110 that includes cognitive computing system 112 for extracting attack characteristics 120 from input data 114 from electronic content sources 102 external to the monitored computing environment 104 and the internal data 116 from sources, e.g., security monitoring engines or the like, internal to the monitored computing environment 104. For example, the internal data 116 may comprise security log information from monitored endpoint devices, e.g., servers, client computing devices, network devices, firewalls, database systems, software applications executing on computing devices, and the like. Security monitoring engines may comprise agents deployed on such endpoint devices which collect security events, e.g., failed login attempts, password changes, network traffic patterns, system configuration changes, etc. occurring at the various endpoint devices and log this information in a security event log data structure. The security monitoring engine(s) may apply SIEM rules to perform some analysis of these security events to identify patterns indicative of suspicious activity that may be indicative of a security attack or vulnerability, triggering a corresponding action to be performed. Moreover, the security monitoring engine(s) may provide such security event log information to the SIEM rules management system 100 for further evaluation.

Furthermore, the cognitive computing system 112 of the SIEM rule management system 100, e.g., IBM Watson™ for Cybersecurity, ingests and processes, via cognitive computing operations based on machine learning, one or more corpora of natural language and/or structured content present in the external input 114 to identify portions of content, e.g., web pages, stored electronic documents from various sources, messages in instant messaging systems, blog posts, electronic versions of published papers, and the like, that reference security attacks/vulnerabilities or attack characteristics, indicators of compromise (IoCs) that specify features indicative of possible threats to a computing resource or computing environment, and the like. The cognitive computing system 112 generates an IoC vector output that comprises vector slots having attack characteristics 120 for any identified attacks. These attack characteristics 120 may be uses in categorizing potential attacks or threats, as discussed hereafter.

The cognitive computing system 112 may continuously or periodically scan the sources of content of the one or more corpora providing the external input 114, for content to ingest and cognitively analyze to identify potential threats or attacks. In this way, the cognitive computing system 112 automatically keeps up to date the latest knowledge of security threats/attacks that are being documented via the various sources of content, e.g., websites, blogs, published documentation, and the like. The cognitive computing system 112 utilizes natural language processing, machine learning, and other such computing resources of cognitive computing systems to evaluate the natural language or unstructured content, as well as structured content, to extract the features of attacks/threats and indicators of compromise (IoCs) that may be indicative of newly discovered and/or existing security attacks/threats which may or may not have yet been codified as SIEM rules for use in identifying actual instances of such attacks or threats against monitored computing environments. That is, the knowledge extracted by the cognitive computing system 112 from external sources 114 may be combined with information extracted from internal sources 116 to identify attack characteristic 120 which may then be used along with specific customer/client information and/or monitored computing environment information to identify the probability that particular security events detected in the monitored computing environment are actual attacks or threats. Moreover, this information may be used to determine if there are adequate SIEM rules present for handling such an attack/threat or whether new SIEM rules need to be automatically generated to address the attack/threat.

In addition to the internal data 116, e.g., security log information, obtained from the monitored endpoint devices of the monitored computing environment 104, and the information regarding threats, or indicators of compromise (IoCs), identified by the cognitive computing system 112 (e.g., IBM Watson™ for Cybersecurity in some illustrative embodiments) from the external input data 114, the mechanisms of the illustrative embodiments may further ingest information that is collected and recorded about the specific users of the SIEM rules management system 100, e.g., the customers/clients of the SIEM rules management system 100 whose computing environments 104 are being managed by the SIEM rules management system 100. For example, the SIEM rules management system 100 may ingest data about each managed computing environment 104 indicating asset information, employee physical locations, office locations, client industry, incident data, etc. from a customer/client information database 130.

The SIEM rules management system 100 ingests the external input data 114, internal input data 116, and client information 130, and extracts attack characteristics 120 from the ingested information via the cognitive computing system 112. Examples of these attack characteristics 120 include a type of event specified in a security log, source identifier (e.g., Internet Protocol (IP) addresses, Uniform Resource Locators (URLs), domains, etc.), file hashes, anti-virus and/or firewall signatures (i.e. unique identifiers given to a known threat so that the threat can be identified in the future), attack vector/method (i.e., a path or means by which a hacker can gain access to a computer system for malicious purposes), and the like. These attack characteristics may be used to populate and/or update a security event history trend database 140 which stores entries specifying security events that represent security threats (or attacks). The security event history trend database 140 may be used to recognize attack characteristics that have been seen before with previously identified security threats/attacks and may store identifiers of associated actions taken in response to these potential attacks, e.g., what SIEM rule was used, what new SIEM rule was generated, etc. If an entry is present in the security event history trend database 140 that matches the particular combination of attack characteristics identified via that extraction of these attack characteristics 120 from the ingested information, then a weighting value associated with that entry may be increased to reflect the increased frequency of seeing that particular combination of attack characteristics. If a match is not found, then a new entry may be added to the security event history trend database 140. With the security event history trend database 140, the attack characteristics 120 may be used to identify potential security threats/attacks even in the case where an indicator of compromise (IoC) is not specifically identified in the ingested data 114, 116, 130 by the cognitive computing system 112.

The analysis of the attack characteristics 120 further comprises a categorization of the attack characteristics 120 and IoCs into predetermined categories of predetermined category types by the attack characteristics categorization engine 150. For example, the attack vector/methods attack characteristic may be analyzed by the attack characteristics categorization engine 150 to determine security log sources and event IDs, affected device groups, rule categories and thresholds, etc. Moreover, the extracted attack characteristics associated with the Internet Protocol (IP) addresses, Uniform Resource Locator (URL)/domain indicators, hashes, signatures, and the like may be analyzed by the attack characteristics categorization engine 150 to identify references to data collections. The results of the various analysis performed by the attack characteristics categorization engine 150 may then be used by the engine 150 to categorize the attack characteristics into a plurality of predefined categories. For example, there may be various types of categories, e.g., log source categories, event categories, event sub-categories, event identifier categories, threshold categories, and the like as discussed previously above, and each type of category may have predefined categories within them (see example brute force attack provided previously above). The particular attack characteristics 120 of a security event may be categorized into a plurality of these categories to thereby categorize the security event identified in the internal data 116.

The SIEM rules management system 100 further includes a SIEM IoC inspection subsystem 160 that implements a machine learning model 162, which may be implemented as a neural network, a cognitive computing system, or any other suitable artificial intelligence (AI) model that employs machine learning, which learns, for various customer/client data and industry data, which IoCs are potentially normal for that industry and customer/client and which IoCs are likely indicative of an actual threat or attack. For example, the cognitive computing system 112 may identify an IoC based on a large network traffic burst whose source is from a geological area known as a security threat source, e.g., a large network traffic burst from a source in Country A, where through cognitive analysis of a corpus of content (e.g., provided in the external input 114), it has been determined that Country A may be a source of attacks on computing systems associated with the particular customer/client of the SIEM rule management system 100 or the industry of the customer/client.

The SIEM IoC inspection subsystem's machine learning model 162 may learn patterns of information indicative of an actual attack/threat and patterns of information indicative of a normal operation and may evaluate input to generate a confidence value as to whether the identified IoCs in the output of the cognitive computing system 120 are in fact associated with an actual attack or threat, or are instead associated with normal operation. As mentioned previously, as an example, if a large network traffic burst comes from Country A, however the particular client has no presence, e.g., no offices, employees, or business ties, in Country A, this burst of traffic would be considered abnormal and more indicative of a threat or attack than a normal operation. The various attack characteristics associated with the IoC, the client data, and the industry characteristics associated with the particular client, are evaluated using the trained machine learning model 162 of the SIEM IoC inspection subsystem 160 to generate a confidence indicator specifying whether the SIEM IoC analysis indicates a normal operation or an abnormal operation. An appropriate notification may be generated indicating whether or not the IoC is associated with normal operations or abnormal operations if desired by the particular implementation.

In the case that the confidence indicator indicates that the IoC is more likely than not associated with an attack or threat (e.g., the confidence indicator has a value that is equal to or above a particular threshold, or equal to or below a particular threshold, depending on the particular implementation), this information is fed back into the SIEM rules management system 100 for use by the SIEM rule query engine 170 in generating a query to look for appropriate SIEM rules that address the attack or threat. The SIEM rules management system 100 utilizes the machine learning model's 162 evaluation of the IoC relative to the customer/client data 130 and the particular industry, as well as the identification of attack characteristics 120 from the ingested information, their categorization as generated by the attack characteristics categorization engine 150, and the comparison to previously identified security threats or attacks as specified in the security event history trend database 140, to determine if an attack or threat is recognized in the ingested security event information from the cognitive computing system 112 and the security log information from the internal data 116, taking into consideration the normal operations of the particular client and the industry as determined by the machine learning model 162 of the SIEM IoC Inspection subsystem 160.

For example, the confidence indicator generated by the machine learning model 162 of the SIEM IoC inspection subsystem 160 indicates to the SIEM rule query engine 170 of the SIEM rules management system 100 whether the IoCs identified by the cognitive computing system 112 are indicative of an attack or threat. In addition, the attack characteristics 120 extracted from the ingested data may be used to match to entries in the security event history trend database 140 to determine if a similar set of attack characteristics 120 were encountered previously and the corresponding action taken, e.g., existing SIEM rule used, new SIEM rule generated by the SIEM rules management system, or the like.

If either or both of these attack identification operations indicate that it is likely that the ingested information indicates an attack or threat, the SIEM rule query engine 170 of the SIEM rules management system 100 generates a query to search a SIEM rule database 180 to determine if there is a SIEM rule that already exists that is designed to handle the identified attack or threat. If the security event history trend database 140 has a matching entry with that of the extracted attack characteristics 120, within a fuzzy tolerance, e.g., a degree of matching is equal to or above a predetermined threshold, and the corresponding entry indicates a particular SIEM rule was used previously in response to that identified attack or threat, then the SIEM rule query engine 170 of the SIEM rules management system 100 may identify that SIEM rule as an existing SIEM rule that handles the identified attack or threat. If there is not an explicit identification of a SIEM rule in this manner, then the SIEM rule query engine 170 may generate a search query that includes the attack characteristics 120, categories generated by the attack characteristic categorization engine 150, and/or the like, as identified from the ingested data 114, 116.

The SIEM rule search query is then applied to the SIEM rule database 180 to identify one or more SIEM rules that have a sufficiently high match with the attack characteristics, categories, and/or the like, specified in the SIEM rule search query. It should be appreciated that while a single SIEM rule database 180 is shown in FIG. 1, the SIEM rule database 180 may comprise multiple different databases. For example, in one illustrative embodiment, the SIEM rule database 180 may comprise separate databases corresponding to SIEM rules employed by security monitoring engines deployed at various customers/clients monitored computing environments, such that each customer/client may have a different set of SIEM rules specific to their particular monitored computing environments. These are sometimes referred to herein as internal SIEM rules databases. In addition, or alternatively, a global SIEM rule database may be provided, also referred to as an external SIEM rules database, that comprises the SIEM rules generated, stored and utilized by all of the various customers/clients of the SIEM rules management system 100.

In searching for matching SIEM rules in the SIEM rule database 180, fuzzy matching criteria may be utilized that indicates a minimum degree of matching required to indicate that a corresponding SIEM rule matches the SIEM rule search query criteria. The matching SIEM rules may be ranked relative to one another based on their degrees of matching. The highest ranking SIEM rule may then be analyzed to determine if it has a sufficiently high match to the attack characteristics 120 to indicate that the existing SIEM rule is sufficient to handle the attack or threat. As an example, as previously described above, if the SIEM rule is a 100% match, then a determination may be made that there is a pre-existing SIEM rule that handles the attack or threat and that no updates to the SIEM rule are necessary. However, if the match is not 100%, but is equal to or higher than a predetermined threshold, e.g., a match of 80% or greater but less than 100%, then a determination may be made that there is a pre-existing SIEM rule that can handle the attack or threat, but that the pre-existing SIEM rule may need some updates to make it a 100% match for handling the attack or threat.

If the degree of matching is below a predetermined threshold, e.g., below 80% match, then it may be determined that there is not a pre-existing SIEM rule to handle the attack or threat and that a new SIEM rule needs to be generated. In such a case, a SIEM rule generator 190 of the SIEM rules management system 100 generates a new SIEM rule specifying the attack characteristics 120 extracted from the ingested information 114, 116, and/or the categorization of the attack characteristics 120, and associating with these attack characteristics 120 a corresponding action to be taken in response to these attack characteristics 120 being identified by security monitoring engines deployed in the customer/client monitored computing environments, e.g. 104.

The automatically generated SIEM rule generated by the SIEM rule generator 190 of the SIEM rules management system 100 may be stored in a SIEM rules repository or database 180 and enabled for use in monitoring of the customer/client monitored computing environment 104 by one or more security monitoring engines. Moreover, the generated SIEM rule may be stored in the external (or global) SIEM rules database for use in evaluating other attacks/threats. Thus, in this way, SIEM rules may be automatically generated for a monitored computing environment 104 based on the collective knowledge of attacks or threats obtained from client specific security event logs and data, and cognitive computing evaluation of one or more corpora of security intelligence information and publicly available content available from a variety of different sources of security information.

Figure 2A:
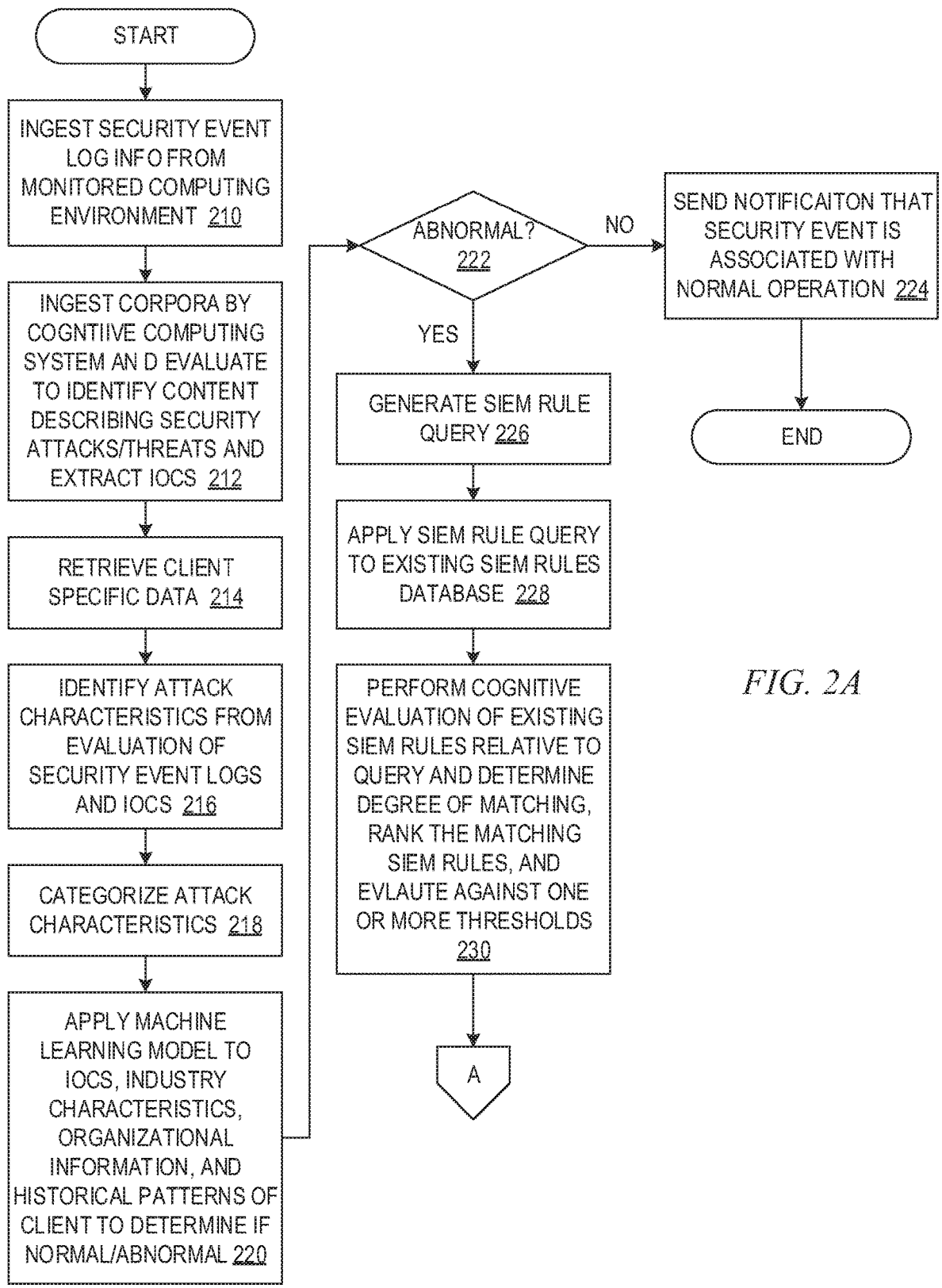
FIGS. 2A and 2B illustrate a flowchart outlining an example operation of a SIEM rules management system in accordance with one illustrative embodiment.
Figure 2B:
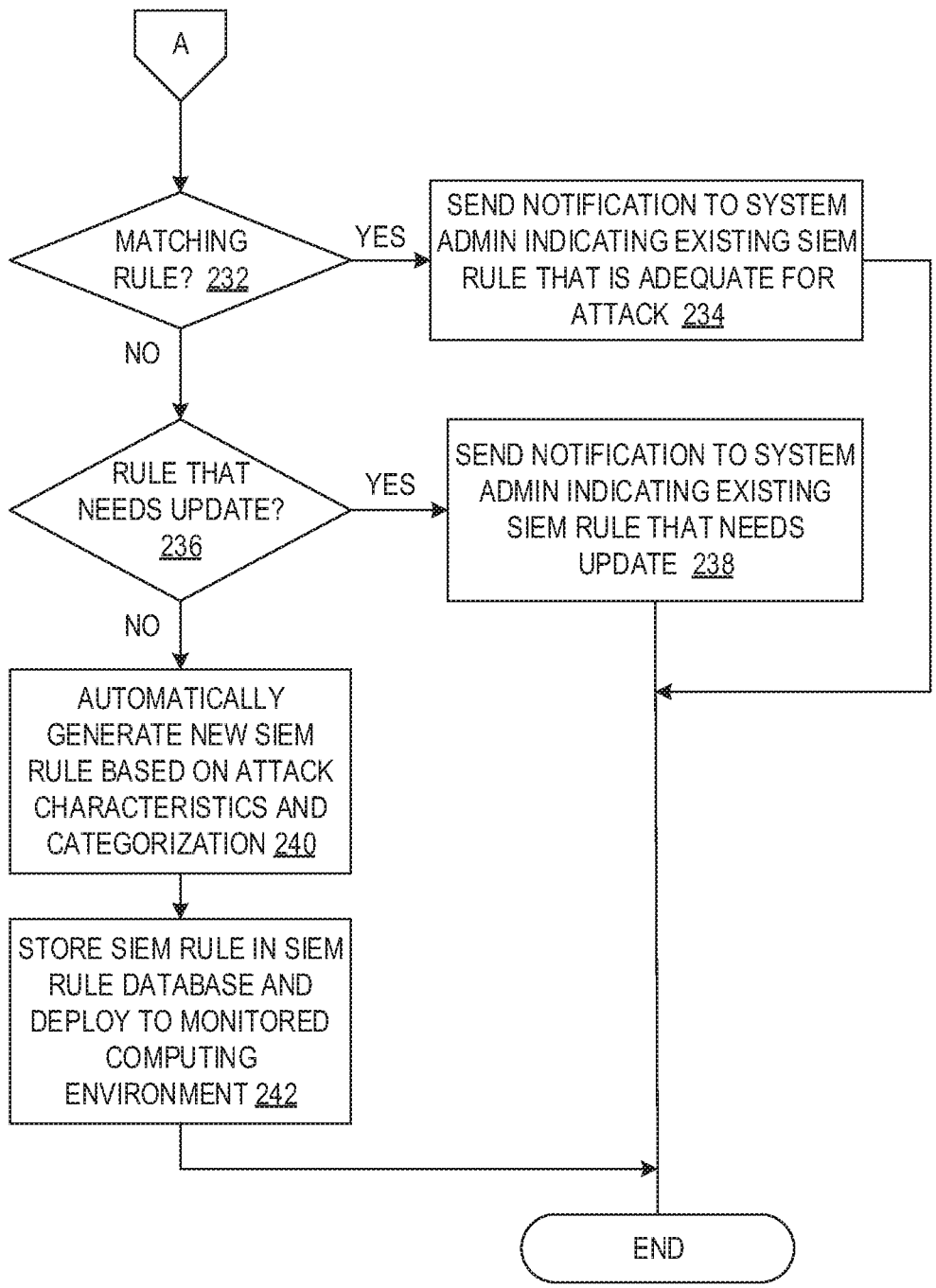

FIGS. 2A and 2B illustrate a flowchart outlining an example operation of a SIEM rules management system in accordance with one illustrative embodiment. As shown in FIGS. 2A and 2B, the operation starts by ingesting security event log information from a security management engine associated with a monitored computing environment (step 210). In addition, one or more corpora of security knowledge source content are ingested by a cognitive computing system and evaluated to identify content describing security attacks/threats and extracting indicators of compromise (IoCs) (step 212). In addition, customer/client specific data is retrieved that indicates specific characteristics of the monitored computing environment and/or the customer/client organization (step 214). Security event logs are analyzed relative to the IoCs to identify attack characteristics associated with security events (step 216).

The attack characteristics are categorized into predetermined categories of one or more category types (step 218). A machine learning model is applied to the IoCs and compared against industry characteristics for the industry of the customer/client, the organizational structure information of the customer/client's organization, and historical patterns associated with the customer/client to determine if the IoCs represent normal behavior or potential attacks (step 220). A determination is made as to whether the IoCs represent abnormal behavior (step 222). In response to the determination indicating that the IoCs represent normal operations, a corresponding notification may be generated and sent to a system administrator associated with the monitored computing environment indicating that the logged security events are normal operations (step 224) and the operation terminates.

In response to the determination indicating that the IoCs represent abnormal operations, the attack characteristics and their categorizations are used to generate a SIEM rule query (step 226). The SIEM rule query is applied to a SIEM rule database to determine if there is a SIEM rule that addresses the attack characteristics (step 228). The search for a matching SIEM rule may utilize cognitive evaluation of the degree of matching of each of the SIEM rules to the attack characteristics, ranking of the matching SIEM rules, and evaluation of the degree of matching relative to one or more thresholds (step 230). A determination is made as to whether a matching SIEM rule is present that adequately addresses the attack characteristics (step 232). If so, a corresponding notification is generated to a system administrator for the monitored computing environment indicating that a SIEM rule exists for addressing the attack characteristics and potentially specifying the SIEM rule (step 234). If not, a determination is made as to whether there is a SIEM rule that provides some functionality for addressing the attack characteristics but requires modification to fully respond to the attack characteristics (step 236).

If so, then a corresponding notification is generated and output to the system administrator indicating the SIEM rule and the need for updating of the SIEM rule (step 238). If not, then a new SIEM rule needs to be generated by a SIEM rule generator based on the attack characteristics (step 240). The automatically generated SIEM rule is stored in the SIEM rule database and deployed to the monitored computing environment for use in handling future security events (step 242). The operation then terminates. It should be appreciated that while the flowchart shows the operation terminating, the operation may be repeated continuously, periodically, or the like, based on newly received security events in security log information from monitored computing environments and/or newly ingested information ingested by the cognitive computing system.

Figure 3:
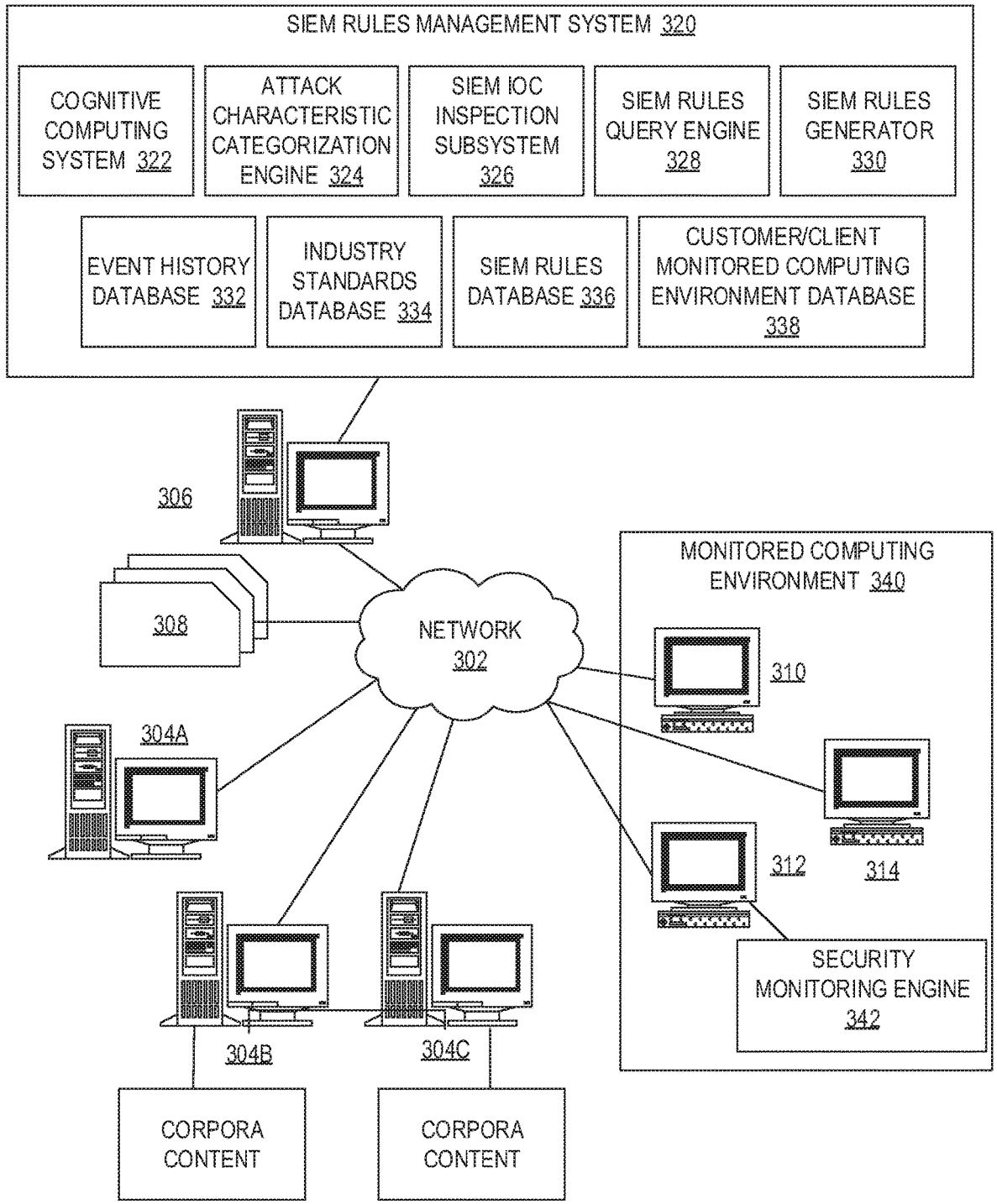
FIG. 3 is an example diagram of a distributed data processing system in which aspects of the illustrative embodiments may be implemented.
Figure 4:
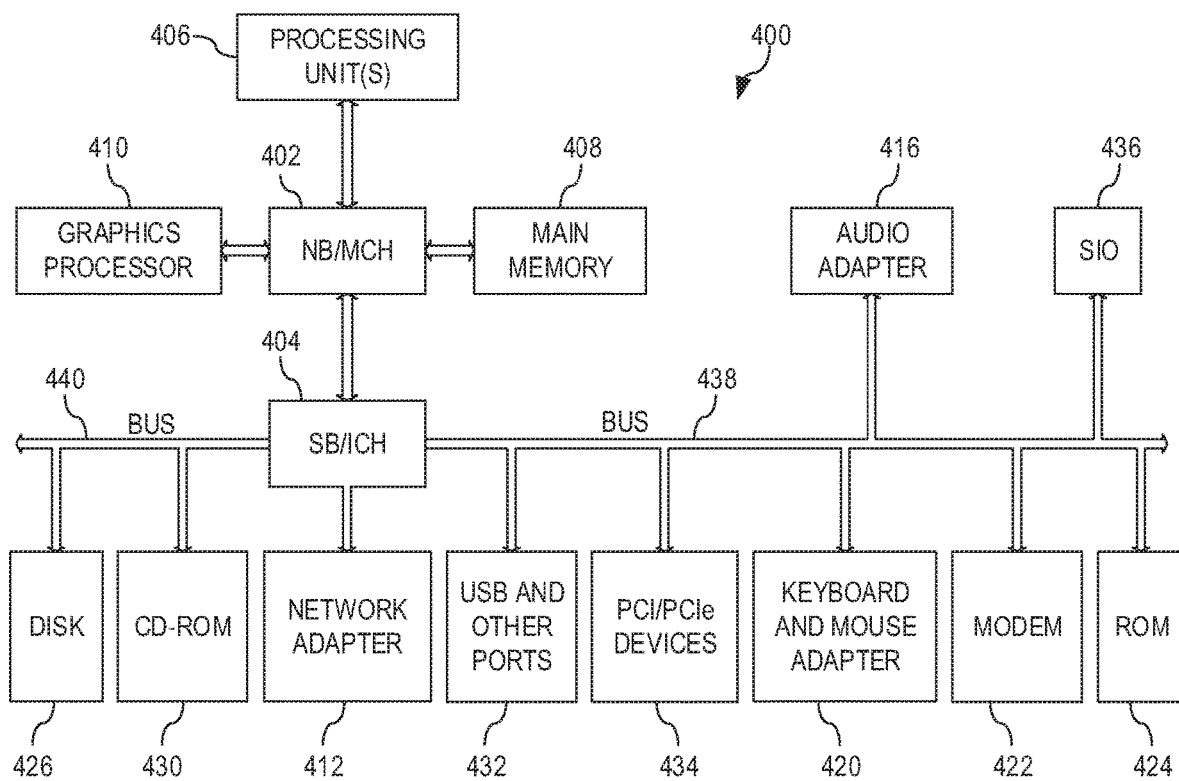
FIG. 4 is an example block diagram of a computing device in which aspects of the illustrative embodiments may be implemented.

It is apparent from the above description that the illustrative embodiments may be utilized in many different types of data processing environments. In order to provide a context for the description of the specific elements and functionality of the illustrative embodiments, FIGS. 3 and 4 are provided hereafter as example environments in which aspects of the illustrative embodiments may be implemented. It should be appreciated that FIGS. 3 and 4 are only examples and are not intended to assert or imply any limitation with regard to the environments in which aspects or embodiments of the present invention may be implemented. Many modifications to the depicted environments may be made without departing from the spirit and scope of the present invention.

FIG. 3 depicts a pictorial representation of an example distributed data processing system in which aspects of the illustrative embodiments may be implemented. Distributed data processing system 300 may include a network of computers in which aspects of the illustrative embodiments may be implemented. The distributed data processing system 300 contains at least one network 302, which is the medium used to provide communication links between various devices and computers connected together within distributed data processing system 300. The network 302 may include connections, such as wire, wireless communication links, or fiber optic cables.

In the depicted example, servers 304A-C and server 306 are connected to network 302 along with storage units 308, which may comprise content for inclusion in one or more corpora upon which the cognitive computing system of the SIEM rules management system 320 operates to identify attacks/threats and their IoCs and attack characteristics. In addition, clients 310, 312, and 314 are also connected to network 302. These clients 310, 312, and 314 may be, for example, personal computers, network computers, or the like. In the depicted example, server 304 provides data accessible by the clients 310, 312, and 314 in order to render content on the clients 310-314 via one or more applications, an operating system, and the like, executing on the clients 310-314. Distributed data processing system 300 may include additional servers, clients, and other devices not shown, e.g., network routing or switching equipment, storage devices, and the like.

In the depicted example, distributed data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 300 may also be implemented to include a number of different types of networks, such as for example, an intranet, a local area network (LAN), a wide area network (WAN), or the like. As stated above, FIG. 3 is intended as an example, not as an architectural limitation for different embodiments of the present invention, and therefore, the particular elements shown in FIG. 3 should not be considered limiting with regard to the environments in which the illustrative embodiments of the present invention may be implemented.

As shown in FIG. 3, one or more of the computing devices, e.g., server 306, may be specifically configured to implement a SIEM rules management system 320. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 304, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, the implementation of the mechanisms of the illustrative embodiments improves the functionality of the computing device and provides a useful and concrete result that facilitates SIEM rule management and automated SIEM rule generation when necessary to address attacks/threats identified via cognitive evaluation of one or more corpora of content concerning security attacks/threats as well as security events from monitored computing environments.

As shown in FIG. 3, one or more of the client devices 310-314 may be associated with a monitored computing environment 340 and may represent computing resources of the monitored computing environment 340. One or more computing devices of the monitored computing environment 340, e.g., one of the client devices 310-314, a server (not shown), or the like, may execute a security monitoring engine 342 which applies SIEM rules to security events occurring with regard to the computing resources of the monitored computing environment to determine if the security events represent attacks/threats and if so, performing a corresponding action specified by the SIEM rules, e.g., sending a notification, generating a log entry, blocking access, etc.

One or more of the servers 304A-C, 306 and/or the storage 308 may provide content for inclusion in one or more corpora of content processed by a cognitive computing system for identifying IoCs and corresponding attack characteristics. For example, the servers 304, 306 and/or storage 308 may provide websites, blogs, electronic messages, published electronic documents, or the like, which may be accessed in data form and processed by the cognitive computing system 322 of the SIEM rules management system 320 for identification of IoCs and corresponding attack characteristics. The content provided may be structured or unstructured and in one illustrative embodiment is provided as natural language documents that are processed by natural language processing mechanisms of the cognitive computing system 322 of the SIEM rules management system 320. As mentioned previously, one example cognitive computing system that may be used is the IBM Watson™ for Cybersecurity cognitive computing system.

The SIEM rules management system 320 comprises the cognitive computing system 322, an attack characteristic categorization engine 324, a SIEM IoC inspection subsystem 326, a SIEM rules query engine 328, and a SIEM rules generator 330. In addition, the SIEM rules management system 320 further comprises an event history database 332, an industry standards database 334, a SIEM rules database 336, and a customer/client monitored computing environment database 338. The event history database 332 stores entries corresponding to security events identified by the SIEM rules management system 320. These entries specify a weight or frequency of occurrence of these security events as well as the responsive actions performed, e.g., the SIEM rules executed that match the attack characteristics of the security events. The industry standards database 334 stores operational characteristic information indicating normal operational behavior of monitored computing environments for particular industries. The SIEM rules database 336 stores the SIEM rules that may be deployed to security monitoring engines of monitored computing environments. The customer/client monitored computing environment database 338 stores specific information about the normal operational behavior characteristics, organizational structure, and other characteristics of the customer/client and its monitored computing environments for use in evaluating the normality or abnormality of IoCs.

The elements 322-330 of the SIEM rules management system 320 operate in a manner such as described above with regard to similar elements in FIG. 1 above. The elements 322-330 utilize the data present in the data structures of the database elements 332-338 to evaluate SIEM rules to determine if exiting SIEM rules are available to address identified attacks/threats and if existing SIEM rules are not available, automatically generating new SIEM rules that address the attack characteristics and IoCs of the attack. Thus, the mechanisms of the illustrative embodiments provide cognitive analysis of content to identify he IoCs and attack characteristics of attacks/threats and apply those to security events logged by monitored computing environments so as to determine if the security events represent actual attacks/threats. This is then used to identify SIEM rules that address such attacks/threats and/or generate new SIEM rules to address such attacks/threats in an automated manner so as to maintain the SIEM rules as up-to-date and relevant to emerging attacks/threats.

As noted above, the mechanisms of the illustrative embodiments utilize specifically configured computing devices, or data processing systems, to perform the operations for SIEM rules management. These computing devices, or data processing systems, may comprise various hardware elements which are specifically configured, either through hardware configuration, software configuration, or a combination of hardware and software configuration, to implement one or more of the systems/subsystems described herein. FIG. 4 is a block diagram of just one example data processing system in which aspects of the illustrative embodiments may be implemented. Data processing system 400 is an example of a computer, such as server 304 in FIG. 3, in which computer usable code or instructions implementing the processes and aspects of the illustrative embodiments of the present invention may be located and/or executed so as to achieve the operation, output, and external effects of the illustrative embodiments as described herein.

In the depicted example, data processing system 400 employs a hub architecture including north bridge and memory controller hub (NB/MCH) 402 and south bridge and input/output (I/O) controller hub (SB/ICH) 404. Processing unit 406, main memory 408, and graphics processor 410 are connected to NB/MCH 402. Graphics processor 410 may be connected to NB/MCH 402 through an accelerated graphics port (AGP).

In the depicted example, local area network (LAN) adapter 412 connects to SB/ICH 404. Audio adapter 416, keyboard and mouse adapter 420, modem 422, read only memory (ROM) 424, hard disk drive (HDD) 426, CD-ROM drive 430, universal serial bus (USB) ports and other communication ports 432, and PCI/PCIe devices 434 connect to SB/ICH 404 through bus 438 and bus 440. PCI/PCIe devices may include, for example, Ethernet adapters, add-in cards, and PC cards for notebook computers. PCI uses a card bus controller, while PCIe does not. ROM 424 may be, for example, a flash basic input/output system (BIOS).

HDD 426 and CD-ROM drive 430 connect to SB/ICH 404 through bus 440. HDD 426 and CD-ROM drive 430 may use, for example, an integrated drive electronics (IDE) or serial advanced technology attachment (SATA) interface. Super I/O (SIO) device 436 may be connected to SB/ICH 404.

An operating system runs on processing unit 406. The operating system coordinates and provides control of various components within the data processing system 400 in FIG. 4. As a client, the operating system may be a commercially available operating system such as Microsoft® Windows107®. An object-oriented programming system, such as the Java™ programming system, may run in conjunction with the operating system and provides calls to the operating system from Java™ programs or applications executing on data processing system 400.

As a server, data processing system 400 may be, for example, an IBM eServer™ System p® computer system, Power™ processor based computer system, or the like, running the Advanced Interactive Executive)(AIX® operating system or the LINUX® operating system. Data processing system 400 may be a symmetric multiprocessor (SMP) system including a plurality of processors in processing unit 406. Alternatively, a single processor system may be employed.

Instructions for the operating system, the object-oriented programming system, and applications or programs are located on storage devices, such as HDD 426, and may be loaded into main memory 408 for execution by processing unit 406. The processes for illustrative embodiments of the present invention may be performed by processing unit 406 using computer usable program code, which may be located in a memory such as, for example, main memory 408, ROM 424, or in one or more peripheral devices 426 and 430, for example.

A bus system, such as bus 438 or bus 440 as shown in FIG. 4, may be comprised of one or more buses. Of course, the bus system may be implemented using any type of communication fabric or architecture that provides for a transfer of data between different components or devices attached to the fabric or architecture. A communication unit, such as modem 422 or network adapter 412 of FIG. 4, may include one or more devices used to transmit and receive data. A memory may be, for example, main memory 408, ROM 424, or a cache such as found in NB/MCH 402 in FIG. 4.

As mentioned above, in some illustrative embodiments the mechanisms of the illustrative embodiments may be implemented as application specific hardware, firmware, or the like, application software stored in a storage device, such as HDD 426 and loaded into memory, such as main memory 408, for executed by one or more hardware processors, such as processing unit 406, or the like. As such, the computing device shown in FIG. 4 becomes specifically configured to implement the mechanisms of the illustrative embodiments and specifically configured to perform the operations and generate the outputs described herein with regard to the SIEM rules management system.

Those of ordinary skill in the art will appreciate that the hardware in FIGS. 3 and 4 may vary depending on the implementation. Other internal hardware or peripheral devices, such as flash memory, equivalent non-volatile memory, or optical disk drives and the like, may be used in addition to or in place of the hardware depicted in FIGS. 3 and 4. Also, the processes of the illustrative embodiments may be applied to a multiprocessor data processing system, other than the SMP system mentioned previously, without departing from the spirit and scope of the present invention.

Moreover, the data processing system 400 may take the form of any of a number of different data processing systems including client computing devices, server computing devices, a tablet computer, laptop computer, telephone or other communication device, a personal digital assistant (PDA), or the like. In some illustrative examples, data processing system 400 may be a portable computing device that is configured with flash memory to provide non-volatile memory for storing operating system files and/or user-generated data, for example. Essentially, data processing system 400 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions which are executed by the at least one processor and specifically configure the at least one processor to implement a security rules management system, the method comprising:
   ingesting, by a cognitive computing system of the security rules management system, natural language content from one or more corpora of natural language content describing features of security attacks;
   ingesting, by the cognitive computing system, security event log data from a monitored computing environment;
   processing, by the cognitive computing system, the natural language content from the one or more corpora and the security event log data to identify attack characteristics applicable to the security event log data;
   evaluating, by a security rule query engine of the security rules management system, existing security rules present in a security rules database to determine if any existing security rule addresses the attack characteristics;
   in response to the evaluation indicating that no existing security rule addresses the attack characteristics, automatically generating, by a security rule generator of the security rules management system, a new security rule based on the attack characteristics; and
   deploying, by the security rules management system, the automatically generated new security rule to the monitored computing environment.

2. The method of claim 1, wherein the security event log data is obtained from at least one managed endpoint device of the monitored computing environment, and wherein the security event log data comprises data representing security events occurring in association with the managed endpoint device, wherein the security events comprise one or more of failed login attempts, password change events, network traffic pattern events, or system configuration change events.

3. The method of claim 1, wherein processing the natural language content from the one or more corpora and the security event log data to identify attack characteristics applicable to the security event log data further comprises generating an indicator of compromise (IoC) vector output, wherein the IoC vector output comprises a vector having vector slots corresponding to different IoCs each corresponding to an attack characteristic identified from the processing of the natural language content.

4. The method of claim 3, further comprising processing, by a machine learning model of the security IoC inspection subsystem, the IoCs of the IoC vector output to identify IoC values that are normal for a client or industry corresponding to the monitored computing environment, wherein the machine learning model learns patterns of IoC values that represent at least one of normal operational characteristics of the client or industry corresponding to the monitored computing environment or patterns of IoC values indicative of an actual threat to the monitored computing environment.

5. The method of claim 4, further comprising generating and transmitting a notification to a computing device associated with an authorized individual associated with the monitored computing environment in response to the processing of the IoCs of the IoC vector output indicating the IoC values are indicative of an attack on the monitored computing environment.

6. The method of claim 5, further comprising, in response to the processing of the IoCs of the IoC vector output indicating the IoC values are indicative of an attack on the monitored computing environment, performing the evaluating, by the security rule query engine of the security rules management system, of the existing security rules present in a security rules database to determine if any existing security rule addresses the attack characteristics at least by generating a search query to search the security rules database based on the attack characteristics being search criteria of the search query.

7. The method of claim 6, wherein performing the evaluating of the existing security rules comprises:
   performing a fuzzy matching operation of the attack characteristics with attack characteristics associated with the existing security rules and determining a degree of matching of the attack characteristics with the attack characteristics associated with the existing security rules;
   ranking each existing security rule according to the degrees of matching associated with the existing security rules; and determining if there is at least one existing security rule having a first threshold degree of matching indicating that the at least one existing security rule sufficiently addresses the attack characteristics.

8. The method of claim 7, further comprising, in response to determining that there is not at least one existing security rule having the first threshold degree of matching, determining if there is at least one existing security rule having a second threshold degree of matching indicating that the at least one existing security rule satisfies at least some of the attack characteristics but the at least one existing security rule needs an update.

9. The method of claim 8, wherein the security rule generator automatically generates the new security rule based on the attack characteristics in response to there not being at least one existing security rule having a second threshold degree of matching.

10. The method of claim 9, wherein automatically generating, by a security rule generator of the security rules management system, the new security rule based on the attack characteristics further comprises associating an action to be taken with the attack characteristics in the new security rule and storing the new security rule in the security rules database.

11. The method of claim 1, further comprising ingesting data about the monitored computing environment including at least one of asset information, employee physical location information, office physical location information, client industry information, or incident data, wherein processing the natural language content from the one or more corpora and the security event log data to identify attack characteristics applicable to the security event log data further comprises evaluating the data about the monitored computing environment to determine if the attack characteristics represent a normal operation of the monitored computing environment.

12. The method of claim 1, wherein the attack characteristics comprise at least one of a type of event specified in a security log, a source identifier, a file hash, an anti-virus or firewall signature, or an attack vector/method.

13. The method of claim 1, wherein evaluating existing security rules present in a security rules database to determine if any existing security rule addresses the attack characteristics comprises:
performing a lookup operation in a security event history trend database to identify a previous security event entry having similar attack characteristics to the attack characteristics applicable to the security event log data; and
in response to identifying a matching previous security event entry, identifying a security rule that was used previously to address the matching previous security event entry.

14. The method of claim 13, further comprising, in response to identifying the matching previous security event entry, increasing a weighting value associated with the matching previous security event entry in the security event history trend database.

15. The method of claim 13, further comprising, in response to not identifying a matching previous security event entry, creating a new previous security event entry and populating the new previous security event entry with the attack characteristics applicable to the security event log data.

16. The method of claim 1, wherein processing the natural language content from the one or more corpora and the security event log data to identify attack characteristics applicable to the security event log data further comprises:
categorizing each attack characteristic into one or more predetermined categories; and
executing a query on a first set of security rules local to the monitored computing environment and a query on a second security rules repository external to the monitored computing environment, based on the one or more predetermined categories associated with each attack characteristic, to determine if a new security rule that addresses the attack characteristics is to be automatically generated due to no existing security rule addressing the attack characteristics to a predetermined degree.

17. The method of claim 1, wherein processing, by the cognitive computing system, the natural language content from the one or more corpora and the security event log data to identify attack characteristics applicable to the security event log data further comprises cognitively evaluating characteristics of the monitored computing environment, the attack characteristics, a historical analysis of operations occurring within the monitored computing environment that are determined to be normal or abnormal, and industry characteristics associated with an industry of an entity associated with the monitored computing environment to generate a probability score indicating a probability that a security event in the security event log data is an attack on the monitored computing environment.

18. The method of claim 1, wherein evaluating the existing security rules present in a security rules database to determine if any existing security rule addresses the attack characteristics comprises:
first determining whether at least one existing security rule satisfies a first predetermined threshold amount of the attack characteristics; and
in response to the first determination indicating that no existing security rule satisfies the first predetermined threshold amount, second determining whether at least one existing security rule satisfies a second predetermined threshold amount of the attack characteristics indicating that the at least one security rule satisfies some of the attack characteristics but should be updated, wherein the security rule generator automatically generates the new security rule based on the attack characteristics in response to the second determination indicating that at least one existing security rule does not satisfy the second threshold degree of matching.

19. A computer program product comprising a computer readable storage medium having a computer readable program stored therein, wherein the computer readable program, when executed on a computing device, causes the computing device to implement a security rules management system that operates to:
ingest, by a cognitive computing system of the security rules management system, natural language content from one or more corpora of natural language content describing features of security attacks;
ingest, by the cognitive computing system, security event log data from a monitored computing environment;
process, by the cognitive computing system, the natural language content from the one or more corpora and the security event log data to identify attack characteristics applicable to the security event log data;
evaluate, by a security rule query engine of the security rules management system, existing security rules present in a security rules database to determine if any existing security rule addresses the attack characteristics;

in response to the evaluation indicating that no existing security rule addresses the attack characteristics, automatically generate, by a security rule generator of the security rules management system, a new security rule based on the attack characteristics; and deploy, by the security rules management system, the automatically generated new security rule to the monitored computing environment.

20. An apparatus comprising:

a processor; and a memory coupled to the processor, wherein the memory comprises instructions which, when executed by the processor, cause the processor implement a security rules management system that operates to:

ingest, by a cognitive computing system of the security rules management system, natural language content from one or more corpora of natural language content describing features of security attacks;

ingest, by the cognitive computing system, security event log data from a monitored computing environment;

process, by the cognitive computing system, the natural language content from the one or more corpora and the security event log data to identify attack characteristics applicable to the security event log data;

evaluate, by a security rule query engine of the security rules management system, existing security rules present in a security rules database to determine if any existing security rule addresses the attack characteristics;

in response to the evaluation indicating that no existing security rule addresses the attack characteristics, automatically generate, by a security rule generator of the security rules management system, a new security rule based on the attack characteristics; and deploy, by the security rules management system, the automatically generated new security rule to the monitored computing environment.

* * * * *